(12) United States Patent
Happou et al.

(10) Patent No.: US 7,306,210 B2
(45) Date of Patent: Dec. 11, 2007

(54) FLUID-FILLED TYPE VIBRATION DAMPING DEVICE

(75) Inventors: Hiroaki Happou, Komaki (JP); Atsushi Muramatsu, Komaki (JP); Hiroyuki Ueno, Nagoya (JP); Satoru Takeshima, Ichinomiya (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 11/514,897

(22) Filed: Sep. 5, 2006

(65) Prior Publication Data

US 2007/0085249 A1    Apr. 19, 2007

(30) Foreign Application Priority Data

Sep. 14, 2005  (JP)  ............................. 2005-267427
Feb. 28, 2006  (JP)  ............................. 2006-052971

(51) Int. Cl.
*F16F 13/08* (2006.01)
(52) U.S. Cl. ................................. 267/140.13
(58) Field of Classification Search ............. 267/35, 267/140.11–141.7
See application file for complete search history.

(56) References Cited

U.S. PATENT DOCUMENTS

| | | | |
|---|---|---|---|
| 4,416,445 A | * | 11/1983 | Coad ........................... 267/35 |
| 4,697,793 A | | 10/1987 | Reuter et al. |
| 5,344,127 A | * | 9/1994 | Hettler et al. ........... 267/140.13 |
| 5,601,280 A | * | 2/1997 | Nagaya et al. .......... 267/140.14 |
| 6,311,964 B1 | * | 11/2001 | Suzuki ................... 267/140.13 |
| 6,409,158 B1 | * | 6/2002 | Takashima et al. ..... 267/140.13 |
| 6,598,864 B2 | * | 7/2003 | Freudenberg et al. .. 267/140.13 |

FOREIGN PATENT DOCUMENTS

| | | |
|---|---|---|
| JP | A 2000-291722 | 10/2000 |
| JP | 2003-148548 | 5/2003 |

* cited by examiner

*Primary Examiner*—Christopher P. Schwartz
(74) *Attorney, Agent, or Firm*—Oliff & Berridge, PLC

(57) ABSTRACT

A fluid filled type vibration damping device includes: a main rubber elastic body elastically connecting first and second mounting members; a partition member supported by the second mounting member; a pressure-receiving chamber partially defined by the elastic body and having a non-compressible fluid sealed therein; an equilibrium chamber partially defined by a flexible film and having the non-compressible fluid therein. The chambers are formed to either side of the partition member and an orifice passage permits a fluid communication between the two chambers. A short-circuit passage is formed so that the pressure-receiving and equilibrium chambers are able to be short-circuited through the short-circuit passage. A valve is used for switching the short-circuit passage, and a metal spring is used for holding the valve in a closed state at a predetermined initial level of elastic deformation.

9 Claims, 5 Drawing Sheets

FLUID-FILLED TYPE VIBRATION DAMPING DEVICE

INCORPORATED BY REFERENCE

The disclosures of Japanese Patent Applications No. 2005-267427 filed on Sep. 14, 2005 and No. 2006-052971 filed on Feb. 28, 2006, each including the specification, drawings and abstract are incorporated herein by reference in their entirety.

BACKGROUND OF THE INVENTION

1. Field of the Invention

The present invention relates to a fluid filled type vibration damping device designed to produce vibration damping action based on flow action of a non-compressible fluid sealed therein, and more particularly to a fluid filled type vibration damping device suitable for use as an automotive engine mount, body mount, difference mount, or the like, for example.

2. Description of the Related Art

In the field of vibration damping devices for installation between components making up a vibration transmission system, it has been proposed to utilize vibration damping action based on the flow action, e.g. the resonance action, of a non-compressible fluid sealed therein. One type of such known device is a fluid filled type vibration damping device comprising: a first mounting member attached one of two components to be linked in a vibration damping fashion; a second mounting member attached to the other of the two components; a main rubber elastic body elastically connecting the first mounting member and the second mounting member which are spaced apart from each other; a pressure-receiving chamber whose wall is partially constituted by the main rubber elastic body and that gives rise of pressure fluctuations during vibration input; an equilibrium chamber whose wall is constituted by a flexible film and that readily permits change in volume; and an orifice passage through which the pressure-receiving chamber and equilibrium chamber communicate with each other. A fluid filled vibration-damping device of this type is effectively used for automotive engine mounts, for example.

In a fluid filled type vibration damping device of this kind, when a large vibrational load is input across the first mounting member and the second mounting member, noise and vibration are sometimes emitted by the vibration damping device. Specifically, in the event that an automotive vehicle employing a fluid filled type vibration damping device of the construction described above as an engine mount should happen to drive over grooved pavement or speed bumps, such noise and vibration can be produced at a level noticeable to passengers in the vehicle.

Such noise and vibration occurs when, during input of impulsive vibration, the flow of the fluid through the orifice passage between the pressure-receiving chamber and the equilibrium chamber cannot keep up, so that a transitory high level of negative pressure occurs within the pressure-receiving chamber. In association with this, gas separates from the filled fluid to form bubbles, a phenomenon known as cavitation. The bubbles maintain generally spherical stable condition from initial occurrence through the growth phase, but during bursting undergo deformation and form tiny explosive jets (microjets). This produces water hammer pressure which is propagated to the first mounting member and the second mounting member, and then transmitted to the vehicle body, and the like. This may cause the problem of noise and vibration mentioned previously.

To address this problem, U.S. Pat. No. 4,697,793, for example proposed a structure wherein a slit is formed in a rubber partition film supported by a partition member which partitions the pressure-receiving chamber from the equilibrium chamber. With this rubber partition film, when the pressure difference between the pressure-receiving chamber and the equilibrium chamber rises above a prescribed level, the rubber partition film undergoes elastic deformation due to the action of the pressure difference, whereby the partition member is induced to open up so that the pressure-receiving chamber and equilibrium chamber communicate. This arrangement makes it possible to eliminate the pressure difference between the pressure-receiving chamber and the equilibrium chamber.

However, with the structure proposed in U.S. Pat. No. 4,697,793, the slit in the rubber partition film opens up to allow communication between the pressure-receiving chamber and the equilibrium chamber through the slit, not only where negative pressure has developed in the pressure-receiving chamber but also where positive pressure has developed. Consequently, any pressure difference between the pressure-receiving chamber and the equilibrium chamber is eliminated by the flow of the fluid through the slit, which can make it difficult to ensure adequate relative pressure fluctuations between the pressure-receiving chamber and the equilibrium chamber. As a result, it becomes difficult to ensure adequate fluid flow level through the orifice passage, posing the risk of difficulty in sufficiently attaining the desired vibration damping action on the part of the orifice passage.

To address this new problem, the Assignee proposed in Japanese Unexamined Patent Publication (JP-A-2003-148548) the use of valve means composed of a rubber elastic body. With this arrangement, when a level of negative pressure higher than the predetermined negative pressure should occur in the pressure-receiving chamber, the orifice passage will be short-circuited by means of a short-circuit passage.

Additional research carried out by the inventors has shown that the fluid filled vibration damping device taught in JP-A-2003-148548 is not yet satisfactory in all instances. Specifically, the valve means taught in JP-A-2003-148548 is composed of a relatively thin rubber elastic body. Due to repeated opening and closing or due to change over time, the rubber elastic body constituting the valve means can experience deformation or deterioration, posing the risk that it will no longer be able to maintain the short-circuit passage opening in the fluid-tightly closed state even where the level of negative pressure in the pressure-receiving chamber is lower than the predetermined negative pressure. Additionally, due to repeated elastic deformation, the rubber elastic body per se may rupture. Also, depending on the required properties, elastic deformation of the valve means composed of the rubber elastic body may not afford sufficient accuracy of recovery to initial shape. Furthermore, with valve means employing a rubber elastic body, variability in dimensions and shape tends to occur readily, making it difficult to attain opening and closing of the valve means with the predetermined negative pressure as threshold, at a high level of accuracy.

SUMMARY OF THE INVENTION

It is therefore one object of this invention to provide a fluid filled type vibration damping device of novel construction, which is able to reliably and accurately reduce the extent of noise and vibration occurring during input of large shocking vibration load, while also ensuring sufficient fluid flow through the orifice passage when vibration to be damped is input.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the present invention provides a fluid filled type vibration damping device comprising: a first mounting member; a second mounting member; a main rubber elastic body elastically connecting the first and second mounting members; a partition member supported by the second mounting member; a pressure-receiving chamber whose wall is partially defined by the main rubber elastic body and having a non-compressible fluid sealed therein; an equilibrium chamber whose wall is partially defined by a flexible film and having the non-compressible fluid sealed therein, the chambers being formed to either side of the partition member; an orifice passage formed utilizing the partition member and permitting a fluid communication between the pressure-receiving chamber and the equilibrium chamber; a short-circuit passage formed in the partition member so that the pressure-receiving chamber and the equilibrium chamber communicating through the orifice passage are able to be short-circuited through the short-circuit passage; a valve furnished for switching the short-circuit passage between an open state and a closed state; and a metal spring furnished for holding the valve in the closed state at a predetermined initial level of elastic deformation.

In the fluid filled type vibration damping device of construction in accordance with this mode, the metal spring is employed as urging means for holding the valve in the closed state at a prescribed initial level of elastic deformation. Therefore, accuracy of dimensions and shape can be improved more readily as compared to the case where a rubber elastic body is employed. With this arrangement, the short-circuit passage can be switched reliably and with a higher degree of accuracy between the open state and the closed state at or above the time that negative pressure is produced by cavitation, while at the same time being able advantageously both to ensure desired vibration damping characteristics in the absence of cavitation (i.e. with the pressure-receiving chamber interior at a higher pressure value than the predetermined negative pressure value) and to avoid noise and vibration when cavitation does occur.

By employing a metal spring, despite repeated elastic deformation of the metal spring in order to repeatedly switch the short-circuit passage between the open state and the closed state, rupture or deformation do not readily occur, and it consistently recovers its initial shape. Thus, excellent durability and reliability of operation can be attained advantageously.

Additionally, the metal spring is free from the attenuation which can hinder rapid operation of the valve where a rubber elastic body is used. Thus, it is possible to attain rapid opening and closing of the valve at the predetermined negative pressure.

A second mode of the present invention provides a fluid filled type vibration damping device according to the first mode, wherein the valve and the metal spring are constituted by means of a plate spring disposed on a pressure-receiving chamber side of the partition member with the plate spring being superposed and forced towards a surface of the partition member at a predetermined initial level of elastic deformation so that an opening of the short-circuit passage into the pressure-receiving chamber being covered by the plate spring.

In the fluid filled type vibration damping device of construction in accordance with this mode, since the plate spring can be formed without deviation in dimensions or shape, the level of urging force of the valve against the pressure-receiving chamber-side opening of the short-circuit passage can be established with a high degree of accuracy, and switching of the short-circuit passage between the communicating and closed states at predetermined negative pressure can be attained with good accuracy.

A third mode of the present invention provides a fluid filled type vibration damping device according to the second mode, wherein the plate spring comprises a tongue flap that is secured to the partition member at an outside peripheral edge of the partition member, and extend towards a center of the partition member.

A fourth mode of the present invention provides a fluid filled type vibration damping device according to the second or third mode, wherein the plate spring is supported with being clamped between the main rubber elastic body and an outside peripheral edge of the partition member.

In fluid filled type vibration damping devices of construction in accordance with these modes, the plate spring can be attached and supported utilizing the partition member and the main rubber elastic body without needing a special support structure. With this arrangement, the advantages of fewer component parts and improved ease of assembly can be attained.

A fifth mode of the present invention provides a fluid filled type vibration damping device according to any one of the second through fourth modes, further comprising a plate spring body of a flat plate shape having a U shaped slit formed therethrough so that an inside portion of the U shaped slit is used as the plate spring, and an outside portion of the U shaped slit is used as a positioning member for positioning the plate spring body with respect to the partition member.

In the fluid filled type vibration damping device of construction in accordance with this embodiment, by utilizing a portion of the plate spring body to constitute the plate spring, as well as furnishing positioning member for positioning the plate spring body with respect to the partition member, it is possible to attach the plate spring so as to be stably positioned at the prescribed location without turning or shifting. With this arrangement, stable switching control of the short-circuit passage between the communicating and closed states can be attained, and a high degree of reliability achieved. Additionally, through provision of positioning member, the plate spring can be easily attached while positioned at the prescribed location. Consequently, excellent productivity can be achieved through improved case of assembly.

A sixth mode of the present invention provides a fluid filled type vibration damping device according to the fifth mode, wherein the plate spring body extends over an entire length thereof in one axis-perpendicular direction at a face of the partition member on a side of the pressure-receiving chamber, and is sandwiched between the partition member and the main rubber elastic body at two end portions thereof.

In the fluid filled type vibration damping device of construction in accordance with this mode, the plate spring body can be attached easily by utilizing the partition member and the main rubber elastic body, without needing a special support structure. Consequently, the advantages of fewer component parts and improved productivity can be attained. In this embodiment in particular, by sandwiching the two end portions of the plate spring body between the partition member and the main rubber elastic body respectively, it can be advantageously prevented from slipping out of plate in the axis-perpendicular direction so that the initial attachment state can be advantageously maintained.

A seventh mode of the present invention provides a fluid filled type vibration damping device according to the first mode, wherein the valve includes a one-way valve installed in the short-circuit passage, and the metal spring includes a coil spring attached to the partition member for urging the valve towards a closed direction.

In the fluid filled type vibration damping device of construction in accordance with this mode, by employing as the metal spring a coil spring having even more consistent spring properties than a plate spring, more precise opening and closing operation by the valve, and better endurance of the metal spring, can be achieved.

An eight mode of the present invention provides a fluid filled type vibration damping device according to any one of the first through seventh modes, wherein the short-circuit passage is formed biased towards a side of an opening leading into the equilibrium chamber, from a center of the orifice passage in a lengthwise direction.

In the fluid filled type vibration damping device of construction in accordance with this mode, the opening of the short-circuit passage is formed in that section of the orifice passage which is situated closer to the equilibrium chamber-side opening and which represents the opening on the side at which fluid inflows to the orifice passage when negative pressure is produced in the pressure-receiving chamber. Accordingly, flow of the fluid from the equilibrium chamber to the pressure-receiving chamber through the short-circuit passage due to the short-circuit passage being open may be produced more advantageously. Consequently, negative pressure produced in the pressure-receiving chamber can be eliminated more quickly, and noise or vibration due to cavitation can be more advantageously reduced or avoided.

A ninth mode of the present invention provides a fluid filled type vibration damping device according to any one of the first through eighth modes, wherein at least one of an opening of the short-circuit passage on a face of the partition member on the pressure-receiving chamber side and the valve superposed thereon is furnished with a sealing material.

In the fluid filled type vibration damping device of construction in accordance with this mode, by interposing a sealing material between the opposed faces of the short-circuit passage opening and the valve, dimensional error or assembly error on the part of the partition member or valve can be absorbed by the sealing material. Consequently, the opening of the short-circuit passage can be maintained in a more fluid-tight closed state by means of the valve, and desired vibration damping characteristics can be advantageously attained in the absence of cavitation (particularly with the pressure-receiving chamber interior at a negative pressure lower than the predetermined negative pressure).

As will be apparent from the preceding description, in the fluid filled type vibration damping device of construction in accordance with the present invention, by including a plate spring in the design of the valve means for switching between the open and closed state the short-circuit passage which short-circuits the pressure-receiving chamber and the equilibrium chamber, it becomes possible to eliminate as quickly and reliably as possible a notable level negative pressure produced in the pressure-receiving chamber when a large shocking vibration load is input, and to prevent large vibration or noise from occurring due to gas separation in the pressure-receiving chamber.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
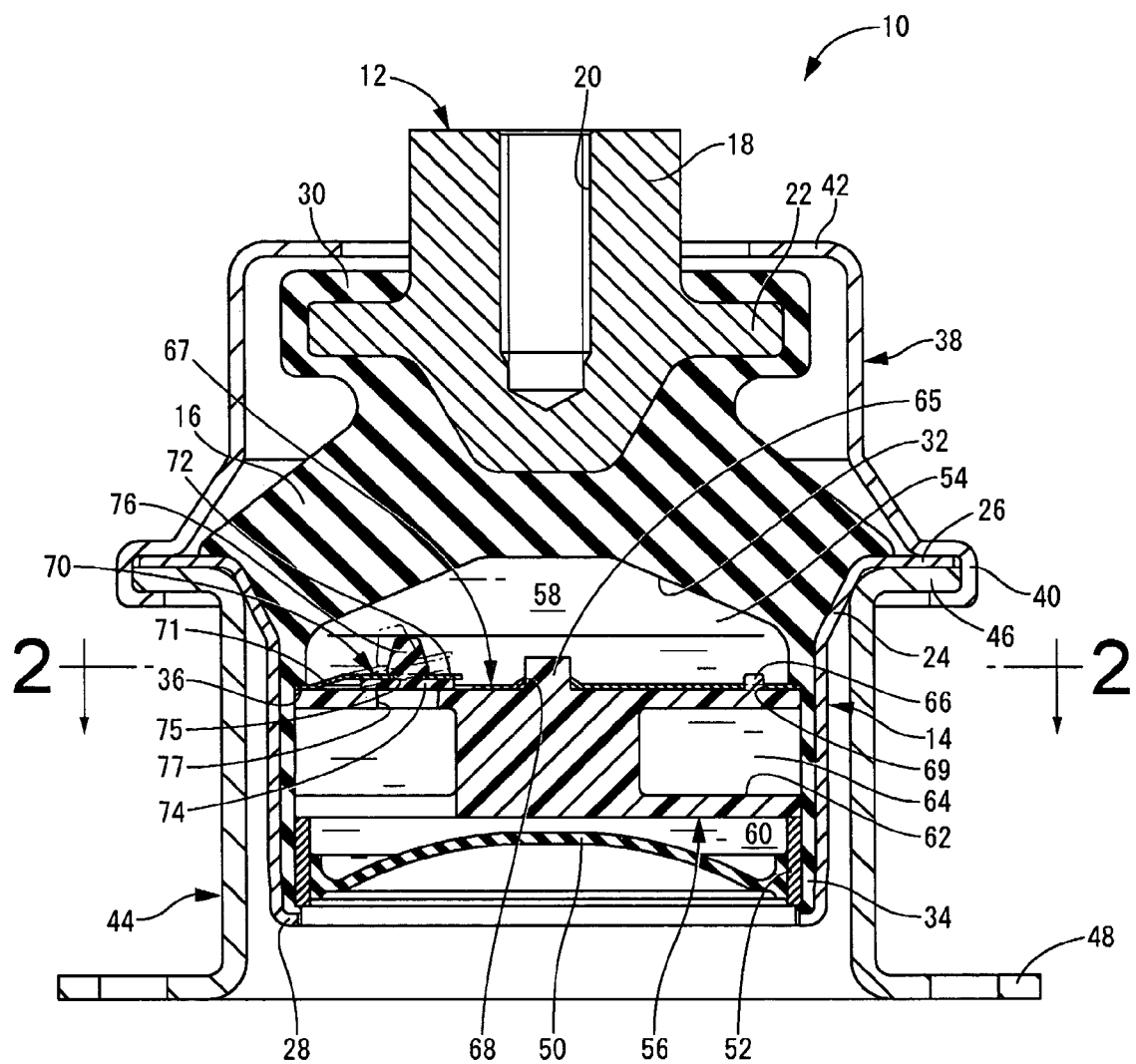
FIG. 1 is a vertical cross sectional view of a fluid filled type vibration damping device in the form of an automotive engine mount of construction according to the first embodiment of the invention, taken along line 1-1 of FIG. 2.
Figure 2:
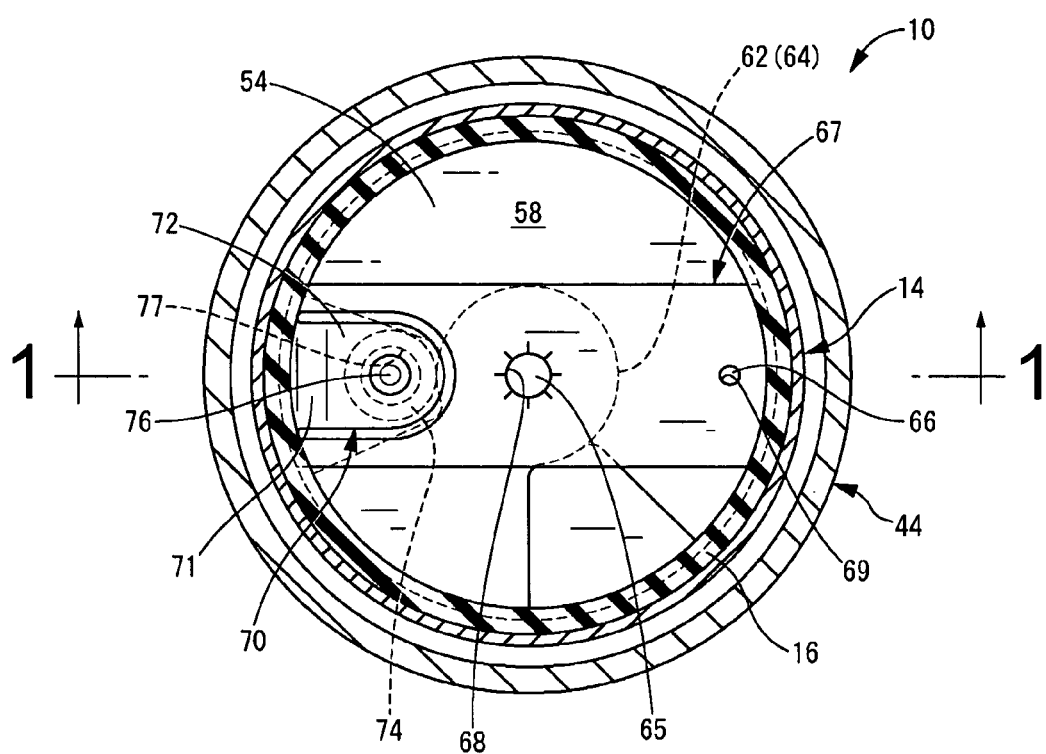
FIG. 2 is a transverse cross sectional view of the engine mount of FIG. 1, taken along line 2-2 of FIG. 1.

Referring first to FIG. 1 and FIG. 2, there is depicted a fluid filled type vibration damping device in the form of an automotive engine mount 10 of construction according to a first embodiment of the invention. This engine mount 10 includes a first mounting member 12 of metal and a second mounting member 14 of metal and a main rubber elastic body 16 elastically connecting the first and second mounting members 12, 14. By attaching the first mounting member 12 to a power unit (not shown) of an automotive vehicle and attaching the second mounting member 14 to a body (not shown) of the vehicle, the power unit is supported in vibration-damping fashion on the vehicle body. In the description hereinbelow, the vertical direction shall as general rule refer to the vertical direction in FIG. 1.

To describe in detail, the first mounting member 12 has an inverted, generally frustoconical block shape with an integrally formed threaded portion 18 projecting upward from its large-diameter end. A screw hole 20 is provided in this threaded portion 18, so that the first mounting member 12 is fixedly attached to the power unit (not shown) by means of a mounting bolt threaded into the screw hole 20. A stopper portion 22 of flange shape projection diametrically outward is integrally formed on an outer circumferential face at the large-diameter end of the first mounting member 12.

The second mounting member 14 has a thin-walled, large diameter, generally round tubular shape. At the opening on the axial upper end of this second mounting member 14 is provided a tapering section 24 that flares out gradually towards the outside in the axial direction. On the inside rim of this tapering section 24, there is integrally formed a flanged portion 26 that spreads diametrically outward. On the axial lower end section of the second mounting member 14 is integrally formed a caulking portion 28 that extends axially downward.

The first mounting member 12 is positioned on approximately the same center axis as the second mounting member 14 and spaced axially above it, with the main rubber elastic body 16 installed between the opposing faces of the first mounting member 12 and the second mounting member 14. This main rubber elastic body 16 has a generally frustoconical shape with an outer circumferential face of tapering cylindrical shape gradually narrowing in diameter upward in the axial direction. The first mounting member 12, inserted axially downward direction into the small-diameter end of the main rubber elastic body 16, is bonded by vulcanization in place, so that the small-diameter end face of the main rubber elastic body 16 is superposed against a lower face of the stopper portion 22 of the first mounting member 12 and bonded by vulcanization thereto. The second mounting member 14 is positioned with the inner circumferential face of its tapering section 24 superposed against the outer circumferential face of the large-diameter end of the main rubber elastic body 16, and bonded by vulcanization thereto. That is, in this embodiment the main rubber elastic body 16 is constituted as an integrally vulcanization molded component vulcanization bonded to the outer circumferential face of the first mounting member 12 and the inner circumferential face of the second mounting member 14, respectively. A cushion rubber 30 integrally formed with the main rubber elastic body 16 is affixed to the stopper portion 22 of the first mounting member 12, so as to project axially upward.

In this integrally vulcanization molded component, the opening on the axial upper side of the second mounting member 14 is provided with fluid-tight closure by the main rubber elastic body 16, thereby forming an internal recess 32 that opens axially downward. A thin rubber seal layer 34 integrally formed with the main rubber elastic body 16 is bonded by vulcanization to the inner circumferential face of the second mounting member 14, so as to cover generally the entire face thereof. In this embodiment, a step portion 36 is disposed in the axially medial portion of the rubber seal layer 34 affixed to the inner circumferential face of the second mounting member 14, with the portion situated axially above the step portion 36 being relatively thick and the portion situated axially below the step portion 36 being relatively thin.

A stopper tube fitting 38 is attached axially above the second mounting member 14. This stopper tube fitting 38 is of generally tubular shape and has at its axial lower end a generally tubular caulking portion 40 extending axially downward and formed via a tapered section that flares out gradually going axially downward. At the axial upper end of the stopper tube fitting 38, there is integrally formed a generally disk shaped stopper strike portion 42 that extends inwardly in the axis-perpendicular direction. The stopper tube fitting 38 is positioned capping the second mounting member 14 from the axial upper side, and the flanged portion 26 of the second mounting member 14 is secured caulked by the caulking portion 40 of the stopper tube fitting 38 to secure it to the second mounting member 14. With the stopper tube fitting 38 in the attached state, the stopper strike portion 42 of the stopper tube fitting 38 is positioned spaced apart from axially above and in opposition to the stopper portion 22 of the first mounting member 12. With this arrangement, when large vibration load is input across the first mounting member 12 and the second mounting member 14, the stopper portion 22 will strike against the stopper strike portion 42 via the cushion rubber 30, thereby constituting a rebound stopper mechanism that limits the level of relative displacement of the first mounting member 12 and the second mounting member 14 in the rebound direction (the direction of moving apart in the axial direction).

An outer bracket 44 is installed fitting externally onto the second mounting member 14. The outer bracket 44 is of generally round tubular shape, with a flange portion 46 spreading outward in the axis-perpendicular direction integrally formed at one axial end thereof (the axial upper end) and a mount flange portion 48 with bolt holes, formed extending outward in the axis-perpendicular direction integrally formed at the other axial end thereof (the axial lower end). The outer bracket 44 is fitted externally onto the second mounting member 14, and the flange portion 46 is superposed against the flanged portion 26 of the second mounting member 14 and secured caulked by the caulking portion 40, thereby affixing the outer bracket 44 to the second mounting member 14. The mount flange portion 48 of the outer bracket 44 is then bolted to the vehicle body (not shown) to attach the second mounting member 14 to the vehicle body via the outer bracket 44.

At the axial lower opening of the second mounting member 14 is disposed a diaphragm 50 serving as the flexible film. This diaphragm 50 takes the form of a generally disk shaped thin rubber film imparted with slack thus making it readily deformable, and having a ring fitting 52 of generally annular shape vulcanization bonded to its outside peripheral edge. This ring fitting 52 is inserted into the second mounting member 14 from the opening at the lower end, and caulked in place by the caulking portion 28 to fasten the diaphragm 50 to the second mounting member 14. By means of this arrangement, the axial lower opening of the second mounting member 14 is capped fluid-tightly by the diaphragm 50, forming a fluid chamber 54 with a non-compressible fluid sealed therein situated between the axially opposed faces of the main rubber elastic body 16 and the diaphragm 50 which respectively cover both axial sides of the second mounting member 14. As the non-compressible fluid sealed within the fluid chamber 54, it is possible to use water, an alkylene glycol, a polyalkylene glycol, silicone oil or a mixture of these. In terms of effectively achieving vibration damping action on the basis of resonance behavior of the fluid through an orifice passage, described later, it is particularly preferable to use a low-viscosity fluid having viscosity of 0.1 Pa·s or lower.

A partition member 56 is also installed in the second mounting member 14. The partition member 56 has a generally thick disk shape overall, and is housed within the fluid chamber 54 so as to extend in the axis-perpendicular direction. By positioning the partition member 56 so as to extend in the axis-perpendicular direction within the fluid chamber 54, the fluid chamber 54 is divided into two sections above and below the partition member 56, thereby forming to the axial upper side of the partition member 56 a pressure-receiving chamber 58 a portion of whose wall is constituted by the main rubber elastic body 16, and which gives rise to pressure fluctuations on the basis of elastic deformation of the main rubber elastic body 16 when vibration is input; and forming to the axial lower side of the partition member 56 an equilibrium chamber 60 a portion of whose wall is constituted by the diaphragm 50 and which readily permits change in volume on the basis of elastic deformation of the diaphragm 50. The outside peripheral edge of the upper face of the partition member 56 is superposed in the axial direction against the step portion 36 of the main rubber elastic body 16 via a cover plate fitting, described later. The outside peripheral edge of the lower face of the partition member 56 is superposed against the upper end of the ring fitting 52, thereby positioning the partition member 56 in the axial direction.

A rectangular groove 62 that extends approximately three-quarters of the way around the circumference of the partition member 56 is formed opening onto its outer circumferential face, with the opening of this rectangular groove 62 being closed fluid-tightly by the second mounting member 14 to form a tunnel-like flow passage. The two ends of this tunnel-like flow passage connect with the pressure-receiving chamber 58 and the equilibrium chamber 60 respectively, so that the flow passage forms an orifice passage 64 extending in the circumferential direction on the outside peripheral portion of the partition member 56, and connecting the pressure-receiving chamber 58 and the equilibrium chamber 60 to one another. By means of this arrangement, the pressure-receiving chamber 58 and the equilibrium chamber 60 are normally held in fluid communication through the orifice passage 64, and flow of fluid filled can be produced between the pressure-receiving chamber 58 and the equilibrium chamber 60, through the orifice passage 64. In this embodiment, by adjusting the orifice passage 64 length and passage cross-sectional area, a high level of attenuating action based on resonance behavior of fluid induced to flow through the orifice passage 64 is produced in response to input of vibration in a low frequency band corresponding to engine shake.

In the center portion in the axis-perpendicular direction of the partition member 56, there is integrally formed projecting portion 65 that projects axially upward, and in the outside peripheral portion thereof there is formed a positioning projection 66 that projects axially upward. In this embodiment, the partition member 56 is formed from rigid resin, and the projecting portion 65 is formed by utilizing a runner or the like formed during molding.

A cover plate fitting 67 constituting a plate spring body of elongated, thin plate shape is superposed against the upper face, i.e. the surface situated on the pressure-receiving chamber 58 side, of the partition member 56. In this embodiment, the cover plate fitting 67 is superposed against the upper surface of the partition member 56 over approximately the entire length of the partition member 56 in one direction across its diameter, and the two lengthwise ends thereof are clamped in the axial direction between the step portion 36 of the main rubber elastic body 16 and the upper face of the partition member 56, securely attaching it in place.

A round insertion hole 68 is formed in the center portion of the cover plate fitting 67, and the projecting portion 65 projecting from the center portion of the partition member 56 is pressed into this insertion hole 68. The insertion hole 68 is smaller in diameter than the projecting portion 65 and has a plurality of slits formed extending radially out from it, so that when the projecting portion 65 is forced into the insertion hole 68 in the mount axial direction, the sections formed the slits gradually incline upwards towards the center, as depicted by the broken lines in FIG. 3. With this arrangement, the projecting portion 65 is advantageously prevented from becoming dislodged from the insertion hole 68.

At a lengthwise end of the cover plate fitting 67, there is formed a positioning hole 69 smaller in diameter than the insertion hole 68. By inserting the positioning projection 66 projecting from the partition member 56 through this positioning hole 69, the cover plate fitting 67 can be prevented from rotating about the insertion hole 68 (projecting portion 65). In this embodiment, the positioning member of the embodiment constitutes inserting the positioning projection 66 through the positioning hole 69. The positioning hole 69 is situated outwardly in the axis-perpendicular direction from a plate spring 70, described later, with the positioning member constituted at a separate location to the outside the plate spring 70.

Figure 3:
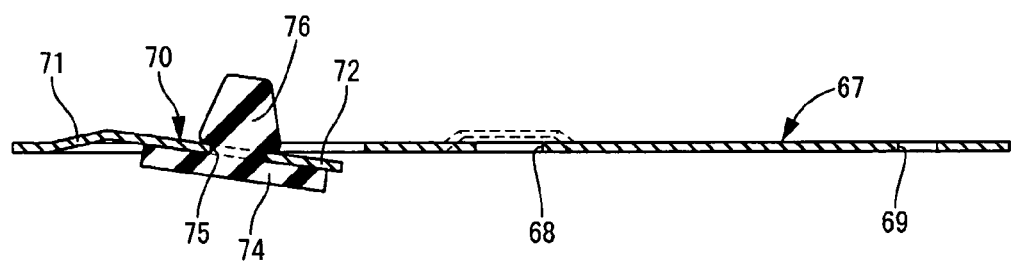
FIG. 3 is an enlarged view in cross section of a principle part of the engine mount of FIG. 1.

A section of the cover plate fitting 67 is furnished with a generally U-shaped rectangular slot, with the section situated inside the U-shaped rectangular slot being bent to raise it upward in the axial direction, forming the plate spring 70 of the embodiment. This plate spring 70 is formed in proximity to the outside peripheral edge of the fluid chamber 54, and in this embodiment in particular is formed so as to be positioned axially above the orifice passage 64. As shown in FIG. 3, the plate spring 70 is arranged such that the portion thereof situated to the outside in the mount axis-perpendicular direction constitutes an inclined portion 71 that extends diagonally upward so as to be positioned gradually upward in the mount axial direction going inward in the mount axis-perpendicular direction. Also the plate spring 70 is arranged such that the portion thereof situated to the inside in the mount axis-perpendicular direction constitutes a cover plate portion 72 that inclines so as to be positioned gradually downward in the mount axial direction going inward in the mount axis-perpendicular direction. In this embodiment, the valve and the metal spring are integrally formed by means of this plate spring 70. As will be understood from the preceding description, the plate spring 70 in this embodiment is constituted as a tongue flap affixed at the outside in the axis-perpendicular direction to the partition member 56, and extending inwardly in the axis-perpendicular direction.

A rubber seal 74 consisting of generally disk shaped sealing material formed of an elastomer is adhered to the lower face of the cover plate portion 72, with the lower face of the rubber seal 74 disposed in abutment with the partition member 56. Additionally, a through-hole 75 is formed in the cover plate portion 72 so as to pass through it in the thickness direction, and a retainer portion 76 is integrally formed with the rubber seal 74 via this through-hole 75. The retainer portion 76 is formed so as to project axially upward from the upper face of the cover plate portion 72, and has a generally frustoconical shape that gradually constricts in diameter towards its projecting distal end. The retainer portion 76 at the projecting distal end thereof is smaller in diameter than the through-hole 75 while its basal portion is larger in diameter than the through-hole 75. By means of this design, it is possible to force the retainer portion 76 through the through-hole 75 from axially below the cover plate portion 72, and once the retainer portion 76 has been forced through, to prevent it from pulling back out through the through-hole 75 from the basal end side, thus preventing the rubber seal 74 integrally formed with the retainer portion 76 from becoming peeled away from the cover plate portion 72.

As will be apparent from FIG. 1, the cover plate portion 72, in the state of being superposed against the partition member 56, is pressed against the partition member 56 via the rubber seal 74, and the plate spring 70 undergoes elastic deformation such that the cover plate portion 72 becomes approximately parallel to the upper face of the partition member 56, whereby a prescribed initial level of elastic deformation for the plate spring 70 is established. With the cover plate fitting 67 (plate spring 70) attached to the upper face of the partition member 56, the cover plate portion 72 is pressed against the upper face of the partition member 56 by means of elastic force based on initial elastic deformation of the plate spring 70. By means of this pressing force, the rubber seal 74 is pressed fluid-tightly against the upper face of the partition member 56.

In the partition member 56, a short-circuit flow passage 77 is formed as the short-circuit passage. The short-circuit flow passage 77 is a passage of circular hole shape, one opening of which opens to the pressure-receiving chamber 58 and the other opening of which opens to a lengthwise medial section of the orifice passage 64. With this arrangement, the pressure-receiving chamber 58 and the lengthwise medial section of the orifice passage 64 communicate through the short-circuit flow passage 77. In this embodiment, it is formed so as to perforate in the mount axial direction the upper wall of the rectangular groove 62 situated in proximity to the opening of the orifice passage 64 on the equilibrium chamber 60 side. The short-circuit flow passage 77 is smaller in diameter than the rubber seal 74, and with the rubber seal 74 superposed against the partition member 56, the short-circuit flow passage 77 and the rubber seal 74 are positioned approximately in a concentric manner. Thus, at the initial level of elastic deformation of the plate spring 70, the opening of the short-circuit flow passage 77 on the pressure-receiving chamber 58 side will be closed fluid-tightly by the plate spring 70 via the rubber seal 74 pressing against the upper face of the partition member 56.

Here, with the engine mount 10 constructed in accordance with this embodiment installed in an automotive vehicle, when vibration is input in the approximately vertical direction across the first mounting member 12 and the second mounting member 14, on the basis of the relative pressure difference between the pressure-receiving chamber 58 and the equilibrium chamber 60 produced thereby, fluid is caused to flow through the orifice passage 64 between the two chambers 58, 60. In particular, in this embodiment, the orifice passage 64 has been tuned to a low-frequency band such as engine shake, and when low-frequency, large-amplitude vibration is input, with the rubber seal 74 pressing against the upper face of the partition member 56 due to the elastic force of the plate spring 70 the short-circuit flow passage 77 will be maintained in a state of fluid-tight closure by the rubber seal 74. Thus, flow of fluid through the orifice passage 64 can be effectively attained, and effective vibration damping action against engine shake or other low-frequency, large-amplitude vibration can be attained on the basis of resonance behavior of the flowing fluid.

On the other hand, when the engine mount 10 is subjected to large shocking vibration load such as during cranking or sudden deceleration of the automobile, thereby producing a high level of negative pressure in the pressure-receiving chamber 58, the cover plate portion 72 is suctioned and undergoes elastic deformation to lift upward in the approximately axial direction of the mount due to negative pressure within the pressure-receiving chamber 58. By means of this, the cover plate portion 72 (rubber seal 74 affixed to the lower face of the cover plate portion 72) pressed against the opening of the short-circuit flow passage 77 on the pressure-receiving chamber 58 side undergoes displacement away from the opening of the short-circuit flow passage 77 on the pressure-receiving chamber 58 side, so that the opening of the short-circuit flow passage 77 on the pressure-receiving chamber 58 side now opens and fluid flows between the pressure-receiving chamber 58 and the equilibrium chamber 60 through the short-circuit flow passage 77. As a result, the high level of negative pressure produced in the pressure-receiving chamber 58 can be eliminated as quickly as possible, thus effectively preventing separation of gas in the pressure-receiving chamber 58 and associated jarring noise and vibration. The predetermined negative pressure which represents the threshold for opening and closing of the cover plate portion 72 is the relative pressure difference between the pressure-receiving chamber 58 and the equilibrium chamber 60, but since vibration input is transitory and the equilibrium chamber 60 is maintained at approximately atmospheric pressure, it is typically acceptable to view it as the pressure value of the pressure-receiving chamber 58. As will be apparent from the preceding description, the short-circuit flow passage 77 is designed so that it is in the open state in the event that negative pressure whose absolute value is greater than the predetermined negative pressure is produced in the pressure-receiving chamber 58, while being maintained in the closed state as long as there is negative pressure or positive pressure whose absolute value is smaller than the predetermined negative pressure in the pressure-receiving chamber 58, and the predetermined negative pressure may be established appropriately depending on required characteristics and the like. In this embodiment, the short-circuit flow passage 77 is designed to assume the open state in the event that the pressure difference of the pressure-receiving chamber 58 relative to the equilibrium chamber 60, and hence the negative pressure value within the pressure-receiving chamber 58, has an absolute value greater than a prescribed value. Further, this predetermined negative pressure can be established appropriately through modification of the material, dimensions, shape and so on of the plate spring 70, to establish appropriate levels of plate spring 70 rigidity, pressing force against the partition member 56, and so on, so that the valve accurately opens and closes at the desired predetermined negative pressure.

In the engine mount 10 constructed according to this embodiment, the metal plate spring 70 is employed as the valve, whereby the desired dimensions and shape can be achieved with higher precision and free of deviation, as compared to where a rubber elastic body or the like is used for the valve. Consequently, the opening and closing parameter (predetermined negative pressure) of the valve, which varies depending on the dimensions and shape of the plate spring 70, can be adjusted to a prescribed established value with a high degree of accuracy. This makes it possible to advantageously realize both vibration damping action through fluid flow behavior in the event that negative pressure less than the predetermined negative pressure (negative pressure with an absolute value smaller than the absolute value of the predetermined negative pressure), atmospheric pressure, or positive pressure is produced in the pressure-receiving chamber 58, and the effect of reducing or avoiding noise and vibration through rapid elimination of negative pressure in the event that negative pressure in excess of the predetermined negative pressure (negative pressure with an absolute value greater than the absolute value of the predetermined negative pressure) is produced within the pressure-receiving chamber 58.

In this embodiment, switching of the short-circuit flow passage 77 between the open and closed state at or around the predetermined negative pressure is achieved through elastic deformation of the metal plate spring 70. Consequently, as compared with the case of elastic deformation of a rubber elastic body or the like, it is possible to advantageously avoid situations where the negative pressure (predetermined negative pressure) at which the valve opens or closes deviates from its initial value, due to change in the initial level of elastic deformation of the value through deformation or deterioration. Accordingly, it is possible to reliably achieve both vibration damping action based on fluid flow behavior, and to reduce or avoid cavitation in order to reduce or avoid noise and vibration.

Additionally, by employing the plate spring 70 of formed of metal material lacking attenuation, rapid and accurate opening and closing by the valve can be achieved. This makes it possible to attain with a higher degree of accuracy both avoidance of noise and vibration produced by cavitation in the event that negative pressure greater than the predetermined negative pressure is produced in the pressure-receiving chamber 58, and vibration damping action based on flow behavior of the fluid flowing through the orifice passage 64 when negative pressure is less than the predetermined negative pressure.

Further, in this embodiment, the cover plate fitting 67, and hence the plate spring 70, is attached to the main body of the mount by superposing the cover plate fitting 67 against the partition member 56 over the entire length in one direction across the diameter thereof, and a clamping the two end portions of the cover plate fitting 67 between the upper face of the partition member 56 and the lower face of the main rubber elastic body 16. With this arrangement, the cover plate fitting 67 furnished with the valve can be easily attached to the main body of the mount, and excellent productivity can be attained.

In the engine mount 10 of this embodiment, the cover plate fitting 67 is attached to the partition member 56, and hence to the main body of the mount, by clamping the two lengthwise end portions of the cover plate fitting 67 between the partition member 56 and the main rubber elastic body 16, and pushing the projecting portion 65 integrally formed with the center portion of the partition member 56 into the insertion hole 68 formed in the axis-perpendicular center of the cover plate fitting 67. Consequently, it is possible to avoid problems such as rattling or misalignment of the cover plate fitting 67 due to the action of suctioning force based on negative pressure produced within the pressure-receiving chamber 58, so that reliability may be improved. In particular, by means of forming the insertion hole 68 and the projecting portion 65 in the axis-perpendicular center portion, fastening force can be produced efficiently with a small number of fastening locations.

Additionally, by inserting the positioning projection 66 projecting from the partition member 56 into the positioning hole 69 formed in proximity to a lengthwise end of the cover plate fitting 67, rotation of the cover plate fitting 67 about the projecting portion 65 can be effectively prevented, affording further improved reliability.

Figure 4:
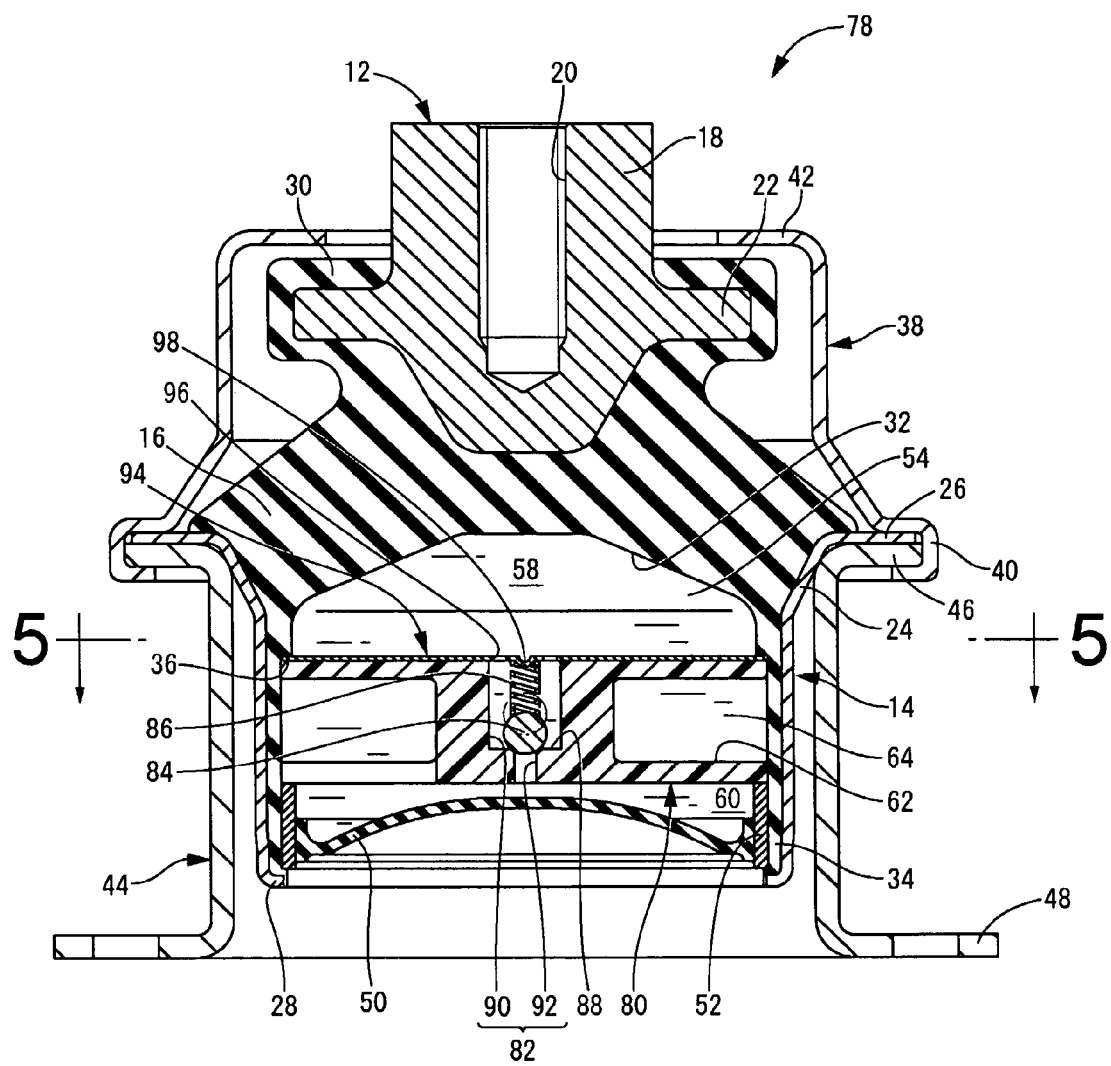
FIG. 4 is a vertical cross sectional view of an automotive engine mount of construction according to the second embodiment of the invention, taken along line 4-4 of FIG. 5.
Figure 5:
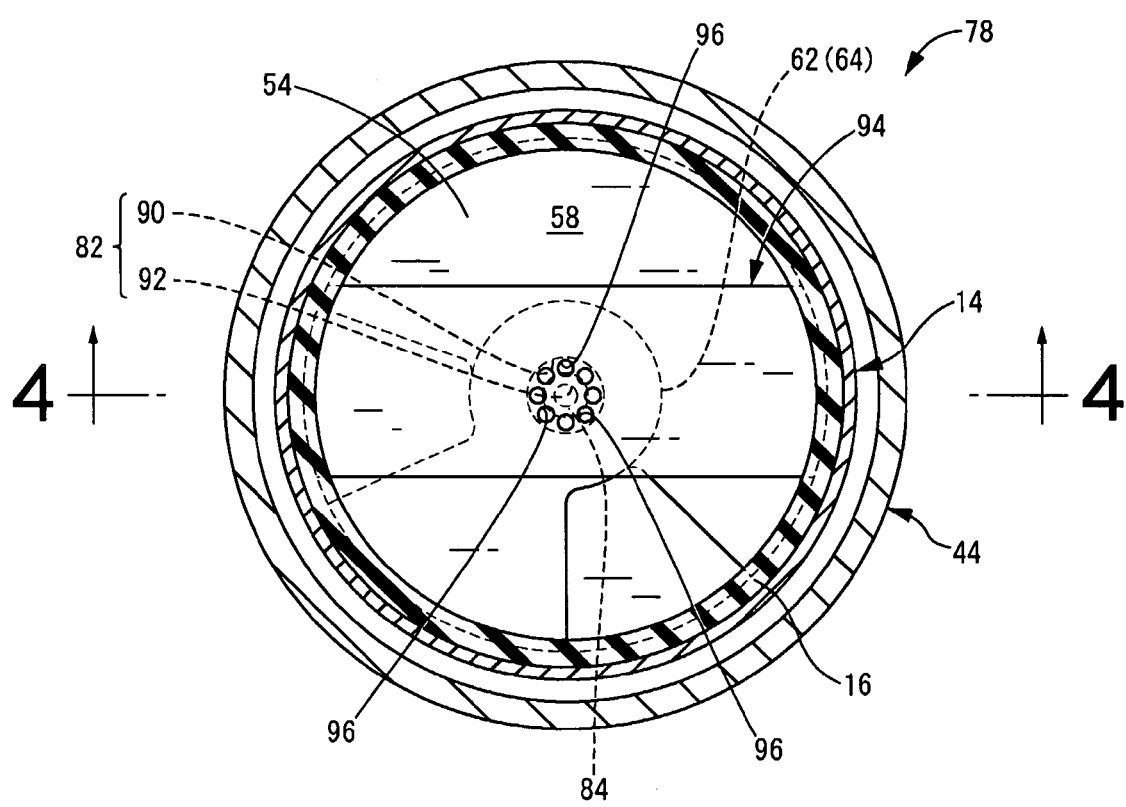
FIG. 5 is a transverse cross sectional view of the engine mount of FIG. 4, taken along line 5-5 of FIG. 4.

Next, an automotive engine mount 78 according to a second embodiment of the invention is depicted in FIG. 4 and FIG. 5. In the following description, components and parts similar in construction to those in the first embodiment are assigned the same symbols in the drawings as in the first embodiment, and are not described in detail.

Specifically, the engine mount 78 of this embodiment, as distinguished from the engine mount 10 of the first embodiment, has a short-circuit flow passage 82 formed so as to pass through the diametrical center portion of a partition member 80. The engine mount 78 also has a cover 84 that functions as a one-way valve for switching the short-circuit flow passage 82 between the open and closed state, and employs a coil spring 86 as the metal spring for holding the cover 84 in the closed position at the initial level of elastic deformation.

To describe in detail, the short-circuit flow passage 82 of this embodiment is formed so as to pass through the diametrical center portion of the partition member 80, whereby the pressure-receiving chamber 58 and the equilibrium chamber 60 respectively formed axially above and below the partition member 80 communicate with each other. The short-circuit flow passage 82 has a step portion 88 formed in its axially medial portion, with the section axially above this step portion 88 constituting a cover housing portion 90 in the form of a large-diameter circular hole, and the section axially below this step portion 88 constituting a connecting flow passage 92 in the form of a small-diameter circular hole.

A cover plate fitting 94 is superposed against the upper face of the partition member 80. The cover plate fitting 94 is of thin, generally flat plate shape, and as in the first embodiment is arranged superposed over approximately the entire length of the partition member 80 in one direction across its diameter. By means of superposing the cover plate fitting 94 against the upper face of the partition member 80, the axial upper end of the short-circuit flow passage 82 is covered by the cover plate fitting 94. As depicted in FIG. 5, the cover plate fitting 94 of this embodiment, as distinguished from the cover plate fitting 67 of the first embodiment, lacks the U shaped slit, the plate spring 70 situated to the inside thereof, and the rubber seal 74 affixed to the plate spring 70. Instead, a number of through-holes 96 consisting of small-diameter round holes perforating the center portion in the axial direction are formed arrayed in the circumferential direction, with the cover housing portion 90 communicating with the pressure-receiving chamber 58 via these through-holes 96. The cover plate fitting 94 in this embodiment, in the portion thereof situated towards the diametric center from the locations of the through-holes 96, constitutes a bowed portion 98 bowing convexly downward in the axial direction, and one end of the coil spring 86, described later, is superposed against this bowed portion 98, thereby positioning the coil spring 86 in the axis-perpendicular direction. The cover plate fitting 94 of this embodiment, as in the first embodiment, is fixedly attached to the main body of the mount with its two lengthwise ends clamped between the step portion 36 of the main rubber elastic body 16 and the upper outside peripheral edge of the partition member 80.

The cover 84 is disposed in the cover housing portion 90 of the short-circuit flow passage 82. The cover 84 is of generally spherical shape having a diameter dimension smaller than the diameter dimension of the cover housing portion 90, but larger than the diameter dimension of the connecting flow passage 92. By means of this design, the cover 84 is accommodated moveably in the axial direction within the cover housing portion 90 and disposed in such a way that it cannot enter into the connecting flow passage 92, thereby constituting a one-way valve that prevents fluid flow through the short-circuit flow passage 82 from the pressure-receiving chamber 58 side to the equilibrium chamber 60 side, while allowing fluid flow through the short-circuit flow passage 82 from the equilibrium chamber 60 side to the pressure-receiving chamber 58 side. The center portion of the step portion 88 is constituted as a spherical bowing face conforming in shape to the surface of the cover 84, whereby it is possible to position the cover 84 in the axis-perpendicular direction as well. By means of employing this construction, the cover 84 can be held in position in the axis-perpendicular center and between the coil spring 86 and the step portion 88 in the axial direction, so that the closed state of the short-circuit flow passage 82, described later, can be more advantageously realized.

The coil spring 86 is disposed in the cover housing portion 90. The coil spring 86 is disposed in the compressed state between the lower face of the cover plate fitting 94 and the cover 84 so as to push the cover 84 against the upper opening of the connecting flow passage 92. The coil spring 86 is positioned in the generally center portion of the cover plate fitting 94, with the axial upper end of the coil spring 86 superposed against a convex bowed portion 98 formed in the center of the cover plate fitting 94, thereby positioning the coil spring 86 in the axis-perpendicular direction. The coil spring 86 is sufficiently smaller in diameter than the diameter dimension of the cover housing portion 90 so that the coil spring 86 is spaced apart from the inside peripheral wall of the cover housing portion 90. With the spherical shaped cover 84 held pressed by the tubular coil spring 86, the cover 84 is held clamped between the coil spring 86 and the upper opening of the connecting flow passage 92 (the step portion 88) and positioned thereby in the center portion of the cover housing portion 90 in the axis-perpendicular direction.

Here, with the engine mount 78 according to this embodiment installed in an automobile, when vibration is input in the approximately vertical direction across the first mounting member 12 and the second mounting member 14, on the basis of the relative pressure difference between the pressure-receiving chamber 58 and the equilibrium chamber 60 produced thereby, fluid is caused to flow through the orifice passage 64 between the two chambers 58, 60. In particular, in this embodiment, the orifice passage 64 has been tuned to a low-frequency band such as engine shake, and when low-frequency, large-amplitude vibration is input, with the cover 84 pressed against the upper opening of the connecting flow passage 92 from axially above it by the elastic force of the coil spring 86, the short-circuit flow passage 82 is maintained in a state of substantial fluid-tight closure, whereby flow of fluid through the orifice passage 64 can be effectively attained, and effective vibration damping action against engine shake or other low-frequency, large-amplitude vibration can be attained on the basis of resonance behavior of the flowing fluid.

On the other hand, when the engine mount 78 is subjected to large shocking vibration load such as during cranking or sudden deceleration of the vehicle, thereby producing a high level of negative pressure in the pressure-receiving chamber 58, the cover 84 is subjected to suction force upward in the generally axial direction of the mount by means of negative pressure in the pressure-receiving chamber 58. When the level of suction force acting on the cover 84 due to negative pressure in the pressure-receiving chamber 58 exceeds the pushing force of the coil spring 86, the cover 84 is displaced axially upward. The cover 84 thereby separates from the upper opening of the connecting flow passage 92 (the step portion 88) so that the short-circuit flow passage 82 now opens and fluid flows between the pressure-receiving chamber 58 and the equilibrium chamber 60 through the short-circuit flow passage 82. As a result, the high level of negative pressure produced in the pressure-receiving chamber 58 can be eliminated as quickly as possible, thus effectively preventing separation of gas in the pressure-receiving chamber 58 and associated jarring noise and vibration.

The engine mount 78 constructed according to this embodiment affords advantages similar to the first embodiment described previously. Additionally, in this embodiment, the magnitude of predetermined negative pressure can be set by means of the coil spring 86. Consequently, switching of the short-circuit flow passage 82 between the open and closed state at prescribed predetermined negative pressure can be attained with an even higher level of accuracy, as compared to the case where the magnitude of predetermined negative pressure is set by means of a rubber elastic body, as well as compared to the case where the magnitude of predetermined negative pressure is set by means of a plate spring 70.

While the present invention has been described in detail in its presently preferred embodiment, for illustrative purpose only, it is to be understood that the invention is by no means limited to the details of the illustrated embodiment, but may be otherwise embodied.

For example, in the first and second embodiments, the cover plate fitting 67, 94 is attached to the main body of the mount by means of clamping the cover plate fitting 67, 94 between the step portion 36 of the main rubber elastic body 16 and the upper outside peripheral edge of the partition member 56, 80. However, it is not always necessary for the cover plate fitting 67, 94 to be attached by clamping it between the step portion 36 of the main rubber elastic body 16 and the partition member 56, 80. Specifically, it may be fastened to partition member by screw fastening, adhesive bonding or other means.

Additionally, it is not always necessary for the cover plate fitting 67, 94 to be superposed extending along the entire diameter of the partition member 56, 80; it is possible to instead dispose the cover plate fitting so as to be superposed against a portion of the upper face of the partition member 56, 80, and to fasten it thereto by means such as screw fastening or adhesive bonding as mentioned above. On the other hand, the cover plate fitting may be superposed covering the upper face of the partition member in its entirety.

The rubber seal 74 described in the first embodiment is not always necessary and may be dispensed with. While in the first embodiment, the rubber seal 74 is affixed to the cover plate portion 72 of the plate spring 70, the rubber seal 74 could instead by affixed to the upper face of the partition member, so that the cover plate portion 72 comes into abutment with the partition member via the rubber seal 74.

In the first and second embodiments, the engine mount 10, 78 has a single-orifice structure having only an orifice passage 64 that is tuned to produce vibration damping action against low-frequency, large-amplitude vibration such as engine shake. However, the invention could also be implemented, for example, in an engine mount of double orifice construction with a first orifice passage tuned to produce vibration damping action of low-frequency, large-amplitude vibration such as engine shake and a second orifice passage tuned to produce vibration damping action of high-frequency, small-amplitude vibration such as idling vibration, or in an engine mount with a number of orifice passages tuned to produce vibration damping action of vibration of different frequency bands. Where the invention is implemented in such an engine mount of a construction having a number of orifice passages, it is possible to provide a short-circuit flow passage and a valve to a single orifice passage selected from the plurality of orifice passages, or to provide a short-circuit flow passage and a valve to each of several orifice passages, or to all of them.

The shape etc. of the plate spring 70 is in no way limited to that taught in the specific disclosure of the embodiment herein. Specifically, whereas in the preceding first embodiment, the inclined portion 71 is formed so as to extend diagonally upward and the cover plate portion 72 is positioned spaced axially above the cover plate fitting 67, it is not always necessary for the plate spring 70 to have this shape, and could instead be formed so that it is positioned substantially coplanar with the cover plate fitting 67, for example.

Figure 6:
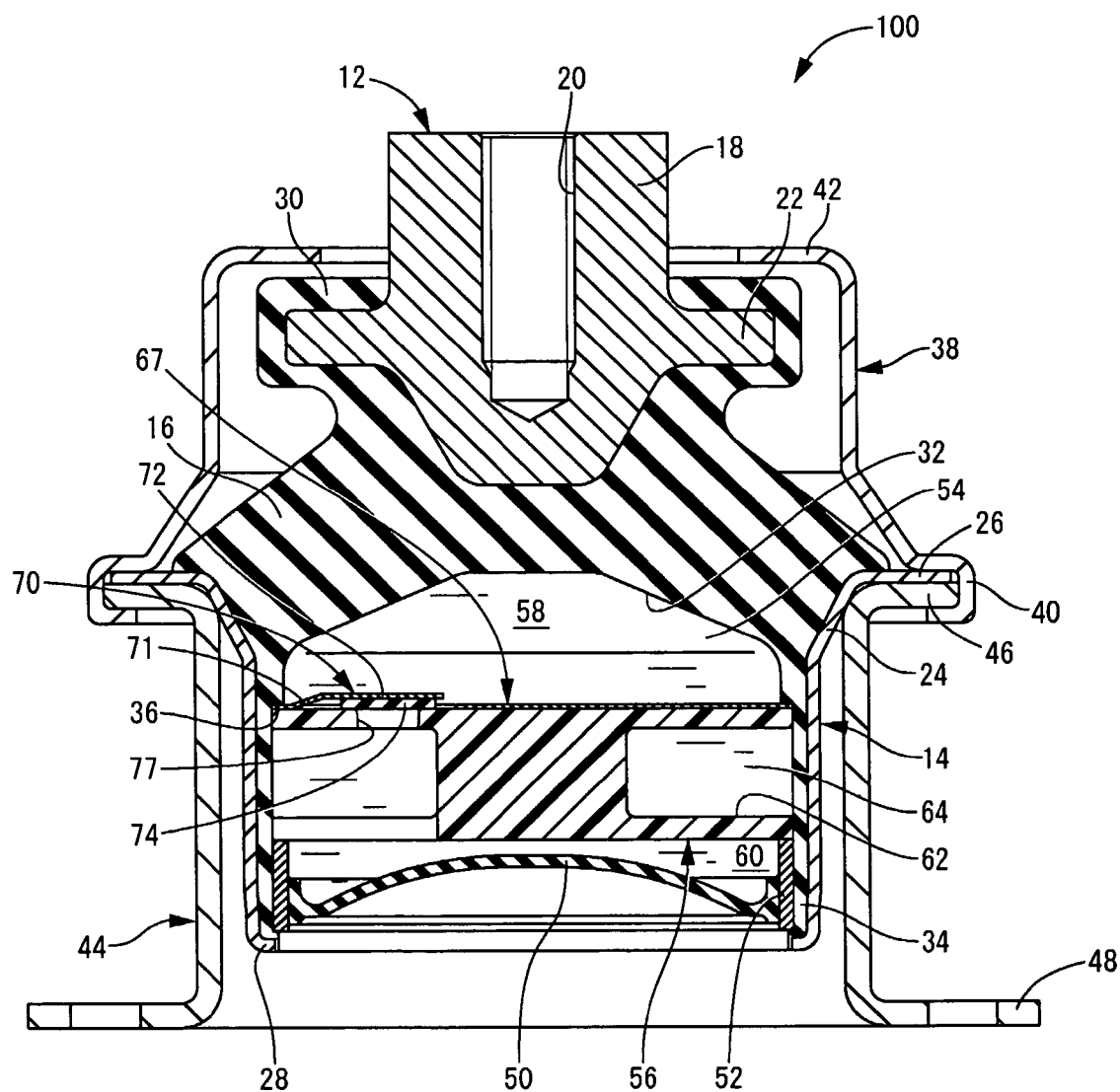
FIG. 6 is a vertical cross sectional view of an automotive engine mount of construction according to another embodiment of the invention.

In the first embodiment, there is furnished positioning member through engagement of the projecting portion 65 and positioning projection 66 provided on the partition member 56 in the insertion hole 68 and positioning hole 69 formed in the cover plate fitting 67. However, as depicted in FIG. 6, such positioning member is not always necessary. As depicted in FIG. 6, the retainer portion 76 integrally formed with the rubber seal 74 may be dispensed with. The engine mount 100 depicted in FIG. 6 is of generally similar construction to the first embodiment, and accordingly identical symbols are used in the drawing, without further description.

It is also to be understood that the present invention may be embodied with various changes, modifications and improvements which may occur to those skilled in the art, without departing from the spirit and scope of the invention.

What is claimed is:

1. A fluid filled type vibration damping device comprising:
    a first mounting member;
    a second mounting member;
    a main rubber elastic body elastically connecting the first and second mounting members;
    a partition member supported by the second mounting member;
    a pressure-receiving chamber whose wall is partially defined by the main rubber elastic body and having a non-compressible fluid sealed therein;
    an equilibrium chamber whose wall is partially defined by a flexible film and having the non-compressible fluid sealed therein, the chambers being formed to either side of the partition member;
    an orifice passage formed utilizing the partition member and permitting a fluid communication between the pressure-receiving chamber and the equilibrium chamber;
    a short-circuit passage formed in the partition member so that the pressure-receiving chamber and the equilibrium chamber communicating through the orifice passage are able to be short-circuited through the short-circuit passage;
    a valve furnished for switching the short-circuit passage between an open state and a closed state; and
    a metal spring furnished for holding the valve in the closed state at a predetermined initial level of elastic deformation, wherein
    the valve is held in the closed state by means of elastic force based on the predetermined initial level of elastic deformation of the metal spring, and when the pressure-receiving chamber generates negative pressure whose absolute value is greater than a predetermined negative pressure that is determined based on the elastic force of the metal spring, the valve is held in the open state for communicating the pressure-receiving chamber and the equilibrium chamber through the short-circuit passage.

2. A fluid filled type vibration damping device according to claim 1, wherein the valve and the metal spring are constituted by means of a plate spring disposed on a pressure-receiving chamber side of the partition member with the plate spring being superposed and forced towards a surface of the partition member at a predetermined initial level of elastic deformation so that an opening of the short-circuit passage into the pressure-receiving chamber is covered by the plate spring.

3. A fluid filled type vibration damping device according to claim 2, wherein the plate spring comprises a tongue flap that is secured to the partition member at an outside peripheral edge of the partition member, and extends towards a center of the partition member.

4. A fluid filled type vibration damping device according to claim 2, wherein the plate spring is supported by being clamped between the main rubber elastic body and an outside peripheral edge of the partition member.

5. A fluid filled type vibration damping device according to claim 2, further comprising a plate spring body of a flat plate shape having a U shaped slit formed therethrough so that an inside portion of the U shaped slit is used as the plate spring, and an outside portion of the U shaped slit is used as a positioning member for positioning the plate spring body with respect to the partition member.

6. A fluid filled type vibration damping device according to claim 5, wherein the plate spring body extends over an entire length thereof in one axis-perpendicular direction at a face of the partition member on a side of the pressure-receiving chamber, and is sandwiched between the partition member and the main rubber elastic body at two end portions thereof.

7. A fluid filled type vibration damping device according to claim 1, wherein the valve includes a one-way valve installed in the short-circuit passage, and the metal spring includes a coil spring attached to the partition member for urging the valve towards a closed direction.

8. A fluid filled type vibration damping device according to claim 1, wherein the short-circuit passage is formed biased towards a side of an opening leading into the equilibrium chamber, from a center of the orifice passage in a lengthwise direction.

9. A fluid filled type vibration damping device according to claim 1, wherein at least one of an opening of the short-circuit passage on a face of the partition member on the pressure-receiving chamber side and the valve superposed thereon is furnished with a sealing material.

* * * * *